(12) United States Patent
Hausner et al.

(10) Patent No.: US 11,845,555 B2
(45) Date of Patent: Dec. 19, 2023

(54) CONVERTIBLE AIRPLANE GALLEY (71) Applicant: Safran Cabin Germany GmbH, Herborn (DE)

(72) Inventors: Dennis Hausner, Haiger (DE); Samuel Klassen, Haiger (DE); Nathalie Christian, Schöffengrund (DE)

(73) Assignee: Safran Cabin Germany GmbH, Herborn (DE)

( * ) Notice: Subject to any disclaimer, the term of this patent is extended or adjusted under 35 U.S.C. 154(b) by 550 days.

(21) Appl. No.: 16/627,196

(22) PCT Filed: Jun. 22, 2018

(86) PCT No.: PCT/EP2018/066795
§ 371 (c)(1),
(2) Date: Dec. 27, 2019

(87) PCT Pub. No.: WO2019/002138
PCT Pub. Date: Jan. 3, 2019

(65) Prior Publication Data
US 2020/0223550 A1 Jul. 16, 2020

Related U.S. Application Data (60) Provisional application No. 62/527,283, filed on Jun. 30, 2017.

(51) Int. Cl.
F25D 11/04 (2006.01)
B64D 11/04 (2006.01)
F25D 23/02 (2006.01)

(52) U.S. Cl.
CPC ............ B64D 11/04 (2013.01); F25D 23/021 (2013.01); F25D 23/025 (2013.01); F25D 23/028 (2013.01)

(58) Field of Classification Search
CPC ..... B64D 11/04; F25D 23/021; F25D 23/025; F25D 23/028
USPC ........... 244/118.5; 312/326, 329, 405, 249.8, 312/291, 292
See application file for complete search history.

(56) References Cited

U.S. PATENT DOCUMENTS

| | | | | |
|---|---|---|---|---|
| 2,435,620 A | * | 2/1948 | Alexander | G03B 21/58 359/450 |
| 3,908,749 A | * | 9/1975 | Williams | A47J 39/006 219/403 |
| 4,588,237 A | * | 5/1986 | Marder | A61G 12/001 312/308 |
| 5,647,651 A | * | 7/1997 | Kim | A47B 67/00 312/291 |

(Continued)

FOREIGN PATENT DOCUMENTS

| | | | |
|---|---|---|---|
| DE | 4315427 | * | 11/1994 |
| DE | 102012112310 A1 | | 6/2013 |

(Continued)

*Primary Examiner* — Janet M Wilkens
(74) *Attorney, Agent, or Firm* — Smartpat PLC (57) ABSTRACT

An on-board device for a vehicle, preferably a galley or a bar for an airplane, has at least one visible side wall and at least one paneling for partially or completely concealing a work area of the on-board device. The paneling is adjustable between at least two configurations. The paneling forms or covers at least part of the side wall in a first configuration and conceals the work area partially or completely in a second configuration.

17 Claims, 8 Drawing Sheets

(56) References Cited

U.S. PATENT DOCUMENTS

| | | | | |
|---|---|---|---|---|
| 5,782,544 | A * | 7/1998 | Johnson, Sr. | A47B 81/062 |
| | | | | 454/193 |
| 6,761,332 | B1 * | 7/2004 | Bengtsson | B64D 11/04 |
| | | | | 244/119 |
| 8,931,857 | B2 | 1/2015 | Godecker et al. | |
| 2001/0050519 | A1 | 12/2001 | Kasuya | |
| 2002/0030139 | A1 * | 3/2002 | Apel | B64D 11/003 |
| | | | | 244/118.5 |
| 2008/0001031 | A1 * | 1/2008 | Doebertin | B64D 11/04 |
| | | | | 244/118.1 |
| 2008/0116773 | A1 | 5/2008 | Loon et al. | |
| 2008/0203869 | A1 * | 8/2008 | Mallory | A47G 29/10 |
| | | | | 312/326 |
| 2009/0065641 | A1 | 3/2009 | Koehn et al. | |
| 2013/0187000 | A1 | 7/2013 | Godecker et al. | |
| 2013/0240669 | A1 | 9/2013 | Wilkinson et al. | |
| 2014/0158826 | A1 * | 6/2014 | Young | B64D 11/02 |
| | | | | 244/118.5 |
| 2014/0238064 | A1 | 8/2014 | Hawkins et al. | |
| 2014/0250792 | A1 | 9/2014 | Curtis et al. | |
| 2014/0355282 | A1 | 12/2014 | Cuddy et al. | |
| 2014/0366454 | A1 | 12/2014 | Burd | |

FOREIGN PATENT DOCUMENTS

| | | | |
|---|---|---|---|
| EP | 2774840 | A1 | 9/2014 |
| EP | 2808255 | A2 | 12/2014 |

* cited by examiner

CONVERTIBLE AIRPLANE GALLEY

TECHNICAL FIELD

The disclosure relates to an on-board device for a vehicle, preferably a galley or a bar for an airplane, which has at least one visible side wall and at least one paneling for partially or completely concealing a work area of the on-board device.

BACKGROUND

The demands on the design and function of galleys in airplanes are wide-ranging. For example, it may be desirable to hide the work area of the galley during boarding, in particular if the galley is at a point in the airplane that is crossed by passengers. During the flight, in turn, the crew needs the work area of the galley to prepare and perform the service. Roller blinds, for example, are used to conceal the work area.

Visible side walls of the galley can be used for various functions, such as welcoming or informing passengers through electronic or printed displays, graphics, signs, logos or symbols. The side walls may have pockets or shelves for the provision of magazines, drinks, etc. However, the use of such a side wall is restricted, as it is stationary and not convertible. Typically, the side wall has no function, or exactly one of the preceding functions is implemented.

In addition, the roller blind for concealing the work area of the galley is also only designed for one function. The roller blind can be lowered during boarding and deboarding, but it must be wound up during the flight, such that it does not fulfill any function in this case, for example during service.

SUMMARY

One object of the disclosure is to provide an improved on-board device for a vehicle, preferably a galley or a bar for an airplane, and in particular to improve the functionality of such an on-board device.

The object is achieved with an on-board device with the characteristics as claimed. Advantageous additional forms follow from the dependent claims, the following summary and the description of preferred exemplary embodiments.

The on-board device is used in vehicles such as airplanes, buses or ships. It is particularly useful when space is at a premium. Preferably, the on-board device is a galley or a bar for an airplane, because the synergistic combination of multiple functions by a single technical means is particularly useful in air transport to effectively use the limited space and save weight.

For this purpose, the on-board device has at least one visible side wall and at least one paneling for partially or completely concealing a work area of the on-board device. As the side wall, the external wall or a section of the external wall of a housing or external cladding of the on-board device come into consideration. The term "side wall" does not refer to a specific side of the on-board device, although it particularly preferably includes a section of the on-board device that is visible from the outside; for example, it is turned towards an aircraft door, and is thus perceptible to passengers during boarding. The paneling is configured to conceal the work area that the crew uses, for example, to prepare or carry out a service, and for this purpose may include technical equipment (oven, microwave, refrigerator, etc.), work surfaces, shelves and the like. If the work area is concealed or hidden by the paneling, the paneling is not considered part of the "side wall" in this configuration.

The paneling is adjustable between at least two configurations, wherein the paneling in a first configuration forms or covers at least a part of the side wall and in a second configuration partially or completely conceals the work area. In other words, the paneling performs at least two functions: a) concealing the work area of the on-board device; b) a side wall function.

While conventional paneling has no function when the work area is exposed, for example when preparing and carrying out the service, in this case it assumes a function of the side wall. In this manner, the side wall of the on-board device can be changed and used in at least two manners. Thus, the side wall and the paneling work together synergistically in order to create a convertible side wall essentially without additional technical means and, at the same time, to ensure a concealing of the work area, if desired. The extended functionality of the on-board device requires neither more space nor more weight.

Preferably, the paneling has an inner side visible in the first configuration and facing the work area in the second configuration, such that, in the latter case, it is not visible from a position outside the on-board device. In this manner, for example, a design, a quality or a functionality of the side wall (such as pockets or holders for drinks, magazines, etc.), visible and accessible in the first configuration, can be completely hidden in the second configuration; that is, with the paneling of the work area.

Such a structure can be achieved by the fact that the paneling is a rotatably mounted door, wherein it is preferably mounted in a pivotable manner by approximately 270° around an axis of rotation. Thereby, the two configurations are preferably formed at the end positions of the achievable pivoting amplitude. Thus, the door-like paneling can assume a closed state (second configuration), in which it conceals the work area, and an open state (first configuration), in which it at least partially forms the side wall. According to this preferred embodiment, the convertibility of the side wall and the reconfiguration of the paneling can be realized in a particularly simple manner in terms of technology.

Preferably, the on-board device has two panelings for the partial concealing of the work area, wherein the two panelings can be formed to be symmetrical. In this manner, a larger/wider access to the work area compared to the side wall can be ensured. The space required for reconfiguration can also be minimized by using two or more panelings.

According to a particularly preferred exemplary embodiment, exactly two panelings are provided, which are symmetrically structured and mounted in a pivotable manner like two hinged doors. In such a case, the on-board device can have an additional visible side wall, wherein the two panelings can be adjusted between the two configurations defined above.

The ability to pivot of the panel(s) is preferably realized around one axis of rotation. However, the panel(s) can be configured in an adjust manner along other and/or additional degrees of freedom. Thus, the panel(s) can be pivoted around additional pivot points and/or axes of rotation and/or can be mounted in a displaceable manner. Furthermore, the on-board device may be equipped with technical means (latch, hook/eye, snap lock, magnet, lock, etc.) for fixing and/or locking the panel(s) in the first and/or second configuration.

Preferably, the side wall provides various service functions in the first and second configurations, wherein the service functions include, for example, the following: displays, such as graphics, signs, logos or symbols; and/or holders, such as shelves or pockets, for the provision or presentation of magazines, beverages and/or other goods. These are concrete examples of how the convertible side wall can be used. By concealing the work area in the second configuration, the service functions presented in the first configuration through the paneling can be completely hidden.

Preferably, the side wall has a recess to accommodate the paneling in the first configuration. This applies analogously to the case of multiple side walls and/or panelings. Preferably, the dimension of the recess corresponds to the dimension of the corresponding paneling. In other words, the recess is preferably dimensioned such that the paneling in the first configuration is accommodated in such a manner that the image of the visible side wall is as homogeneous as possible. For example, the depth of the recess can be dimensioned in such a manner that an approximately flat total surface is formed; that is, the outwardly paneling surface of the paneling and the adjoining surface sections of the remaining side wall run in an essentially continuous manner.

Preferably, the paneling(s) is/are structured from multiple parts that can be pivoted and/or displaced relative to each other. Thus, the paneling (analogous to multiple panelings) can have a main part and an extension, wherein the extension for the first configuration can be stowed in or on the main part in such a manner that the paneling fits into the recess. In this manner, it is possible to modify the total area of the concealment, in particular for the second configuration. In the case of two symmetrical panelings, the exemplary embodiment is particularly useful if the width of the on-board device is greater than twice its depth. The extensions allow the two panelings to be enlarged in the second configuration such that the work area is essentially completely concealed. When changing to the first configuration, the extensions are stowed in or on the main part. This can be achieved by inserting the extension into a gap in the corresponding main part. Alternatively, the extension can be configured in a manner guided on the inner surface or outer surface of the main part so that it can be displaced, or the extension can be mounted in a pivotable manner relative to the main part.

Preferably, the paneling is mounted in a displaceable manner parallel to the corresponding side wall. Here, the paneling can be provided in a displaceable manner, in addition to or as an alternative to a possible ability to pivot. By combining two on-board devices whose work areas are turned towards each other, a configuration can be created with which the area between the two on-board devices is at least partially separated by the panelings, whereby a space of a higher level of privacy, for example for the crew, can be established.

Preferably, the on-board device has a compartment accessible from the side wall and/or the work area. The compartment may be configured as a refrigerated compartment, wherein, in such a case, the on-board device has means for refrigerating the compartment. Preferably, the compartment is accessible via one or more external doors from the side wall and/or one or more internal doors from the work area. In this manner, the compartment is accessible to passengers in the second configuration (boarding state), for example from the aisle via the external door(s), whereby a service can also be offered if the on-board device is not staffed by the crew. For filling and/or operating the compartment by the crew, it is accessible alternatively or additionally via the internal door(s). According to a preferred exemplary embodiment, access to the compartment via the interior door(s) is only possible in the service state, i.e. with the cover open; that is, in such a case, the interior door(s) is/are preferably configured so that they can only be opened in the first configuration.

The height of the panel(s) need not, but may correspond to the height of the on-board device. It preferably corresponds to the height of the work area or the height of the on-board device, but may have a greater or reduced height depending on the intended functionality and desired design.

Although the disclosure is particularly preferred for use in galleys or bars in airplanes, it can also be used in other vehicles, such as buses or ships, as well as other service facilities.

Further advantages and characteristics of this invention can be seen in the following description of preferred exemplary embodiments. The characteristics described therein may be realized alone or in combination with one or more of the characteristics set out above, provided that the characteristics are not contradictory. The following description of preferred exemplary embodiments is made with reference to the accompanying drawings.

DETAILED DESCRIPTION

In the following, preferred exemplary embodiments are described on the basis of the figures. The same, similar or equivalent elements in the figures are provided with identical reference signs, and a repetitive description of such elements is sometimes omitted in order to avoid redundancies.

Figure 1A:
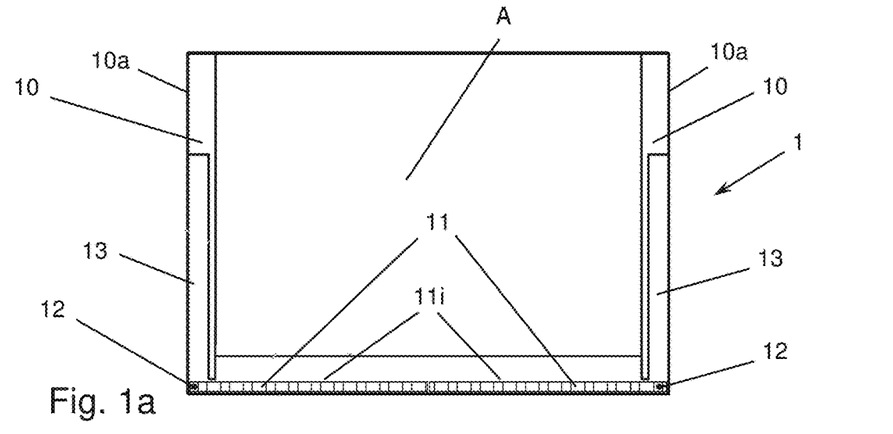
FIGS. 1a, 1b and 1c schematically show the basic structure of an on-board device according to one embodiment, wherein different configurations are each shown as a cross-sectional view.
Figures 1B, 1C:
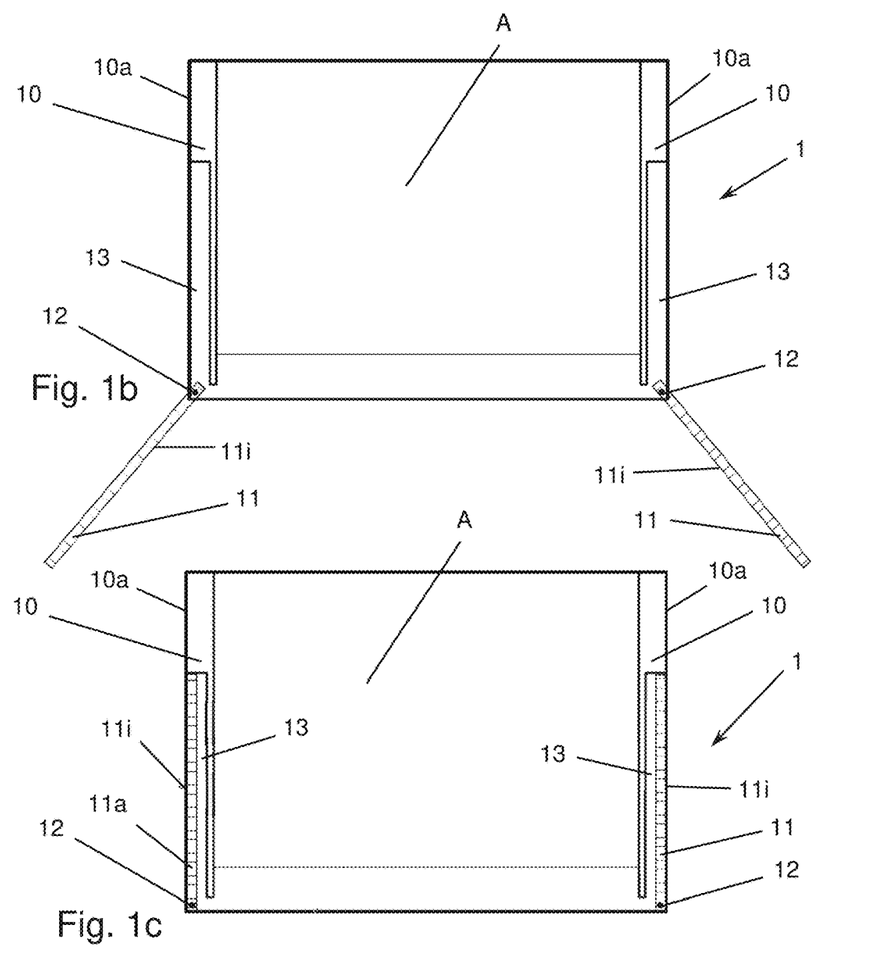

FIGS. 1a, 1b and 1c schematically show the basic structure of an on-board device 1 according to one embodiment. The on-board device 1 is preferably a galley in an airplane, but it may also be another facility, in particular a service facility, such as a bar. Here, FIGS. 1a, 1b and 1c each show different configurations as cross-sectional views, whereby different states of application or usage can be realized.

According to the present exemplary embodiment, the on-board device 1 has two visible side walls 10 and two symmetrically structured and rotatably mounted panelings 11. The panelings 11 are rotatably mounted around an axis of rotation 12, so that they can be opened and closed like hinged doors, as can be seen from the comparison of FIGS. 1a and 1b.

The configuration of FIG. 1a is called "boarding state" or "second configuration." In the boarding state, the outer side 10a of the side wall 10 is visible and can fulfill a desired service function, for example the display of information, greetings, the holding of magazines or beverages, etc. At the same time, the panelings 11 conceal a work area A of the on-board device 1, which serves the crew, for example, for the preparation and/or carrying out of a service and for this purpose can have technical devices (oven, microwave, refrigerator, etc.), working surfaces, shelves and the like. The first configuration can be used for passenger boarding and deboarding, but it can also be used, for example, as a special configuration, for example to enable self-service when the on-board device 1 is not staffed.

The rotary bearings of the panelings 11 are configured in such a manner that each of the panelings 11 can be rotated by 270°. In this manner, a configuration can be realized, as shown in FIG. 1c, with which each of the panelings 11 runs parallel to the corresponding side wall 10 and in this sense forms part of it. Such configuration is referred to as "service state" or a "first configuration."

Although, in the present embodiment, each of the panelings 11 is mounted in a pivotable manner around (exactly) one axis 12, they can also be mounted in a pivotable and/or translational manner around multiple axes.

In the service state, the side wall 10—more precisely, its visible side—is formed completely or at least partially from the inner side 11i of the paneling 11. For this purpose, the side walls 10 can have recesses 13, which accommodate the panelings 11 in the service state, such that these, together with the other side wall sections, form an approximately flat surface. However, there is no limitation in this respect, since the concrete design of the service state (also the boarding state) depends on the desired functionality to be achieved. It is important that, through their ability to pivot by 270°, the panelings 11 can assume two functions: a) concealing the work area A in the boarding state; b) a side wall function in the service state. Thus, the side walls 10 can be used in two ways.

Although FIGS. 1a to 1c show two panelings 11, which are arranged symmetrically and can be pivoted, and each interact synergistically with the corresponding side wall 10, there is no limitation in this respect. For example, a non-symmetrical arrangement is just as feasible as a design variant with exactly one paneling 11. Likewise, both side walls 10 need not have a service function (display, the holding of magazines, drinks, etc.). For example, it is possible that one of the two side walls 10 is not visible from the outside, for example if two on-board devices 1 are arranged next to each other. In such a case, the corresponding paneling 11 can be structured in another manner, for example by displacing and/or pivoting by 90° to 180°.

In the present example, the ability to pivot of the panelings 11 is realized around one axis of rotation 12 each. However, the panelings can be configured in a manner adjustable along other and/or additional degrees of freedom. Thus, the panelings 11 can be pivotable around additional pivot points and/or axes of rotation and/or are mounted in a displaceable manner (see exemplary embodiment of FIGS. 5a and 5b).

In addition, the on-board device may be equipped with technical means (latch, hook/eye, snap lock, magnet, lock, etc.) for fastening and/or locking the panelings 11 in the boarding state and/or service state, in particular to secure the panelings 11 during take-off, landing or turbulence in the air.

Figure 2A:
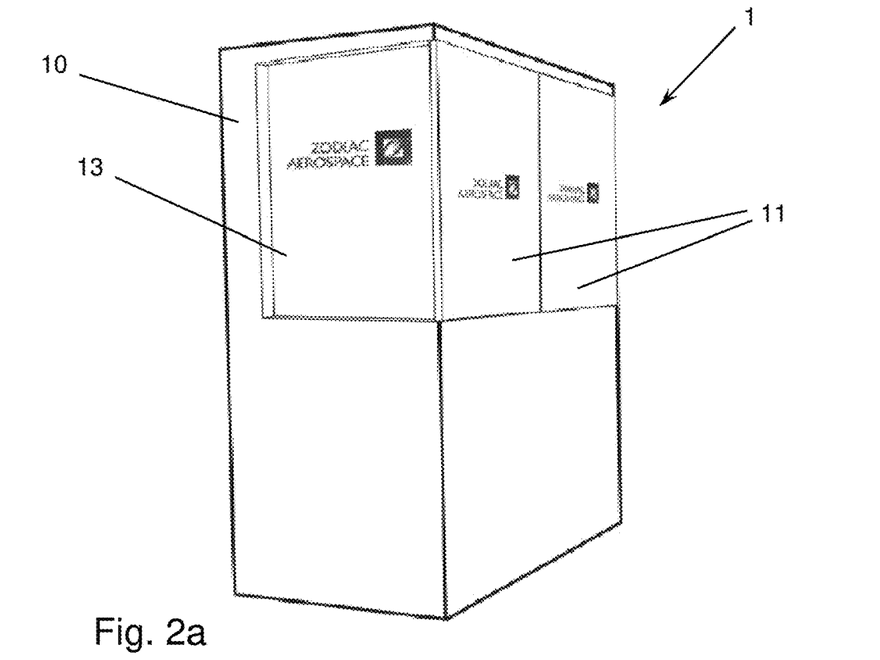
FIGS. 2a and 2b are three-dimensional schematic views showing an exemplary functional design of two configurations of the on-board device.
Figure 2B:
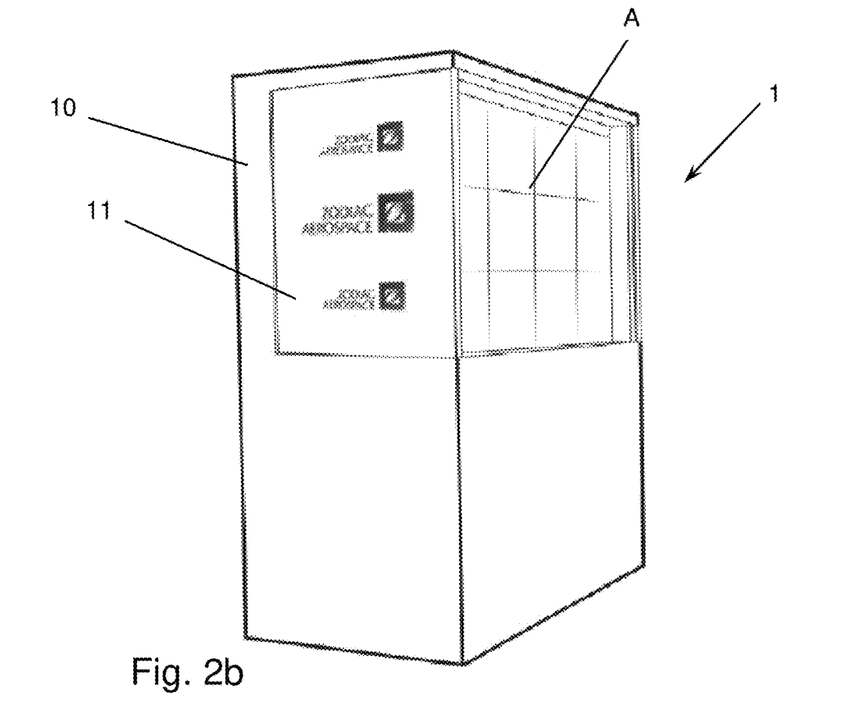

FIGS. 2a and 2b are three-dimensional schematic views showing an exemplary functional design of the boarding state and the service state of the on-board device 1. In the case shown, the two configurations differ in the design of the visible side wall 10. Specifically, different logos are displayed.

Figure 3A:
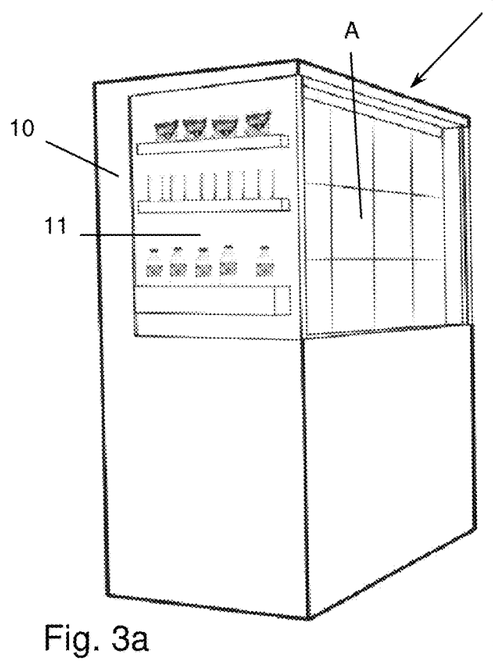
FIGS. 3a to 3e are three-dimensional schematic views showing exemplary functional designs in various configurations of the on-board device.
Figure 3B:
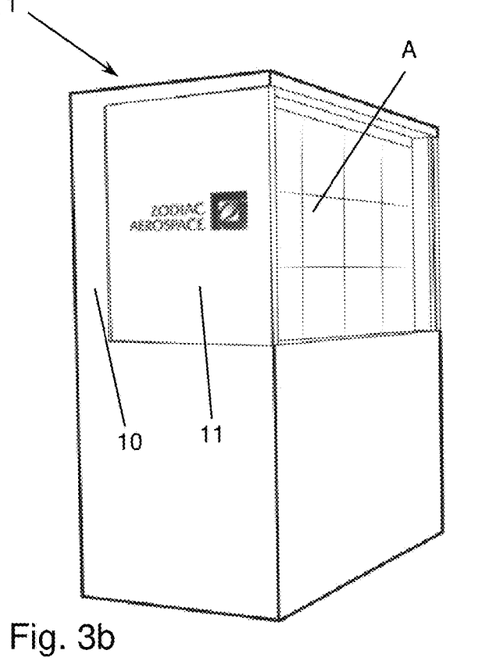
Figure 3C:
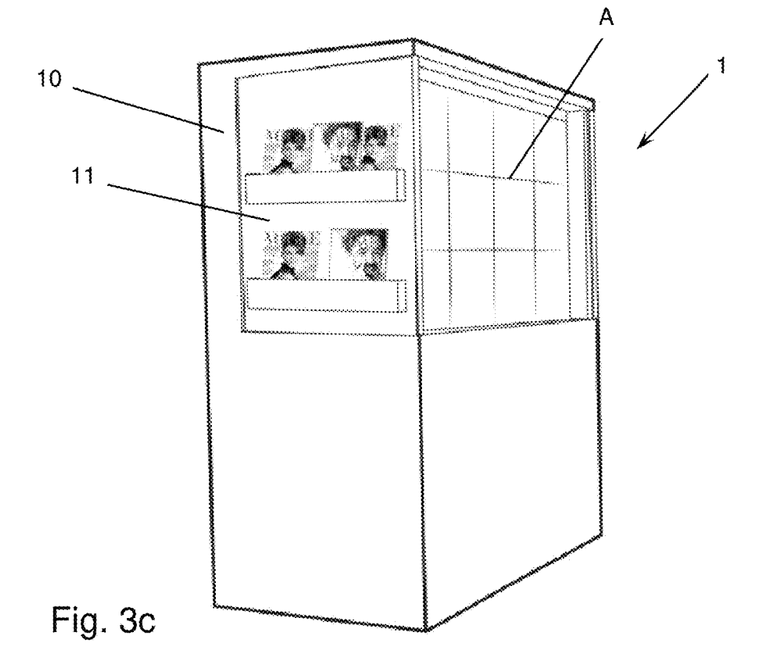

FIGS. 3a, 3b and 3c are three-dimensional schematic views showing various functional designs of the service state of the on-board device 1. Thus, the inner sides 11i of the panelings 11, which form at least part of the side wall 10 in the service state, can be equipped with shelves (pockets, shelves, compartments, etc.) for magazines (see FIG. 3c), beverages or other goods (see FIG. 3a).

FIGS. 2a, 2b and 3a to 3c show that the height of the door-like panelings 11 need not correspond to the height of the on-board device 1. Rather, it can correspond to the height of the work area A, or have a larger or reduced height, depending on the intended functionality and desired design. Likewise, the dimensions of the recesses 13 are variable, or they can be omitted where necessary. Preferably, both the depth and the length of the recesses 13 correspond to the panelings 11 to be accommodated in them.

Figure 3D:
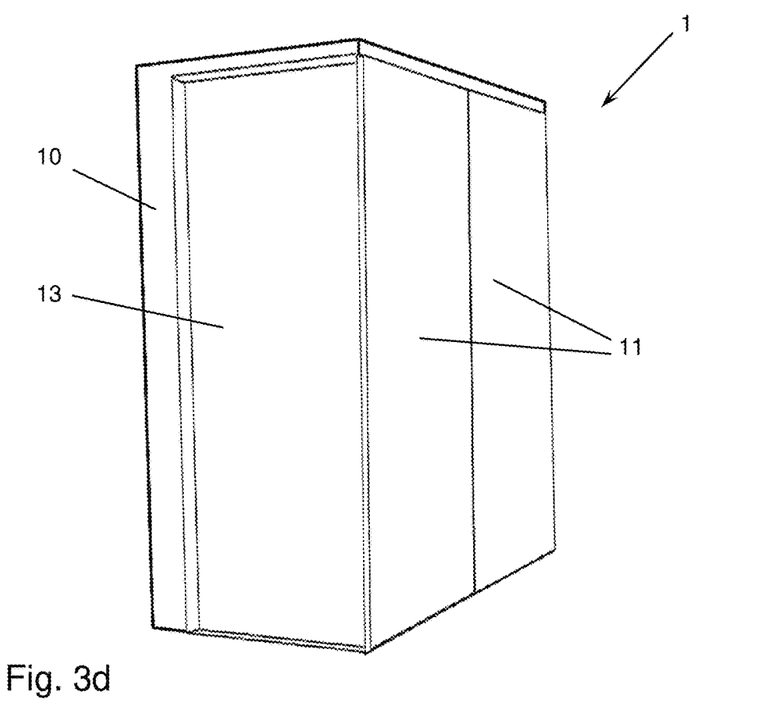
Figure 3E:
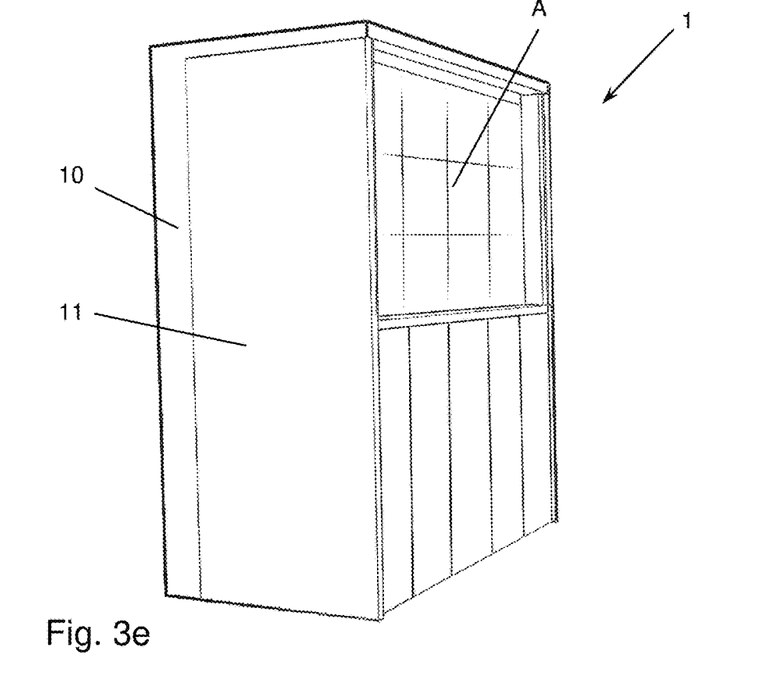

FIGS. 3d and 3e show an exemplary embodiment with which the paneling 11 spans the entire or essentially entire height of the on-board device 1.

Figure 4A:
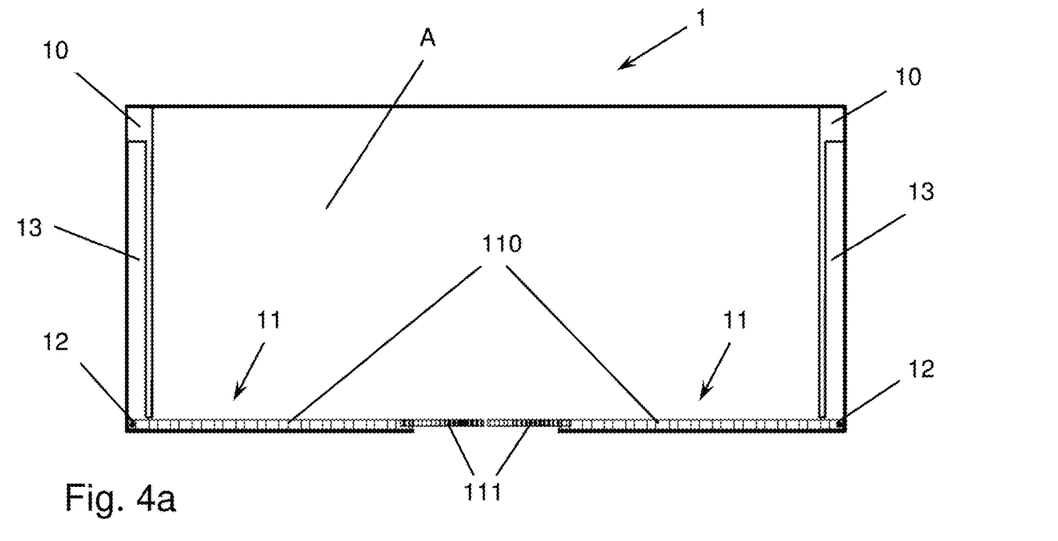
FIGS. 4a, 4b and 4c schematically show the basic structure of an on-board device according to an additional embodiment.
Figures 4B, 4C:
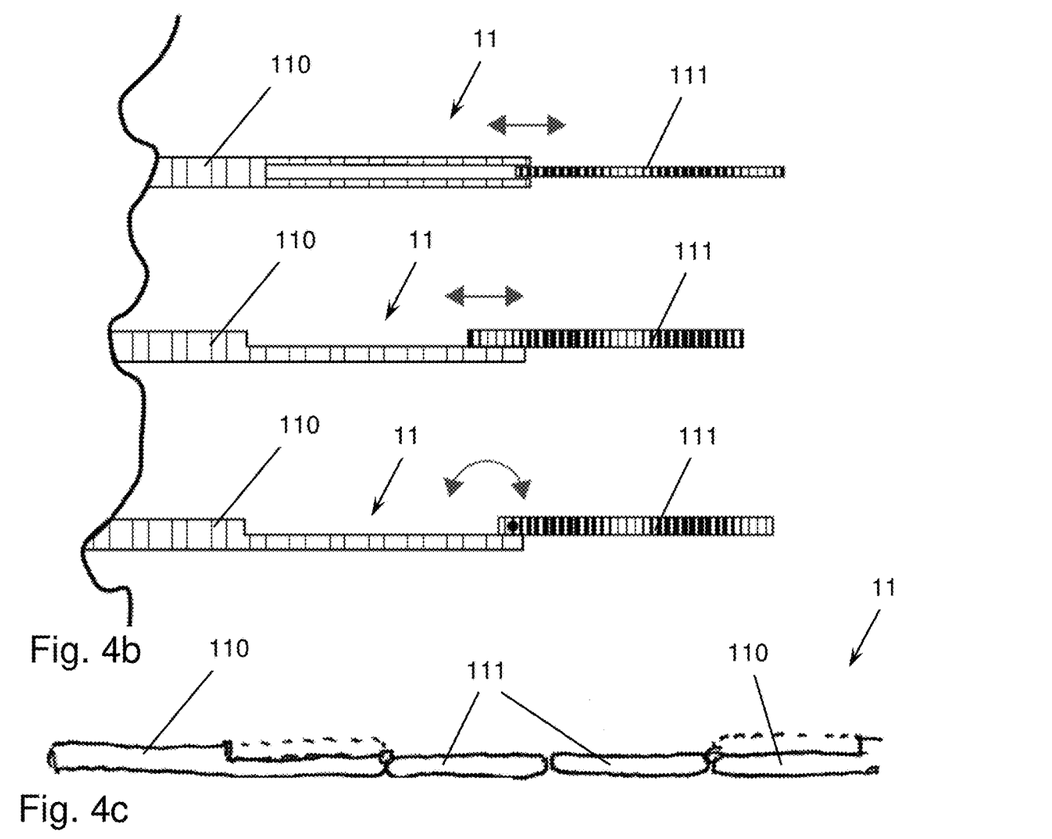

FIGS. 4a, 4b and 4c schematically show the basic structure of an on-board device 1 according to an additional embodiment. The embodiment shown differs from the above exemplary embodiments in that the panelings are structured in multiple parts. In this exemplary embodiment, each of the panelings 11 has a main part of 110 and an extension 111 that can be pivoted and/or displaced relative to it. Such a multi-part design is particularly useful in the case of two symmetrical panelings, if the width of the on-board device 1 is greater than twice its depth. The extensions 111 allow the panelings 11 to be enlarged in the boarding state, such that the work area A is essentially completely concealed.

When changing to the first configuration, the extension 111 is stowed in or on the main part 110. This can be achieved by inserting extension 111 into a gap in the corresponding main part 110; see upper variant of FIG. 4b. Alternatively, the extension 111 can be configured in a manner guided on the inner surface or outer surface of the main part 110 so that it can be displaced, see middle variant of FIG. 4b, or the extension 111 can be mounted in a pivotable manner relative to the main part 110, see lower variant of FIG. 4b and FIG. 4c. In the variant of FIG. 4c, an essentially flat visible outer surface of the panel(s) 11 is achieved in the unfolded state of extension(s) 111.

Figure 5A:
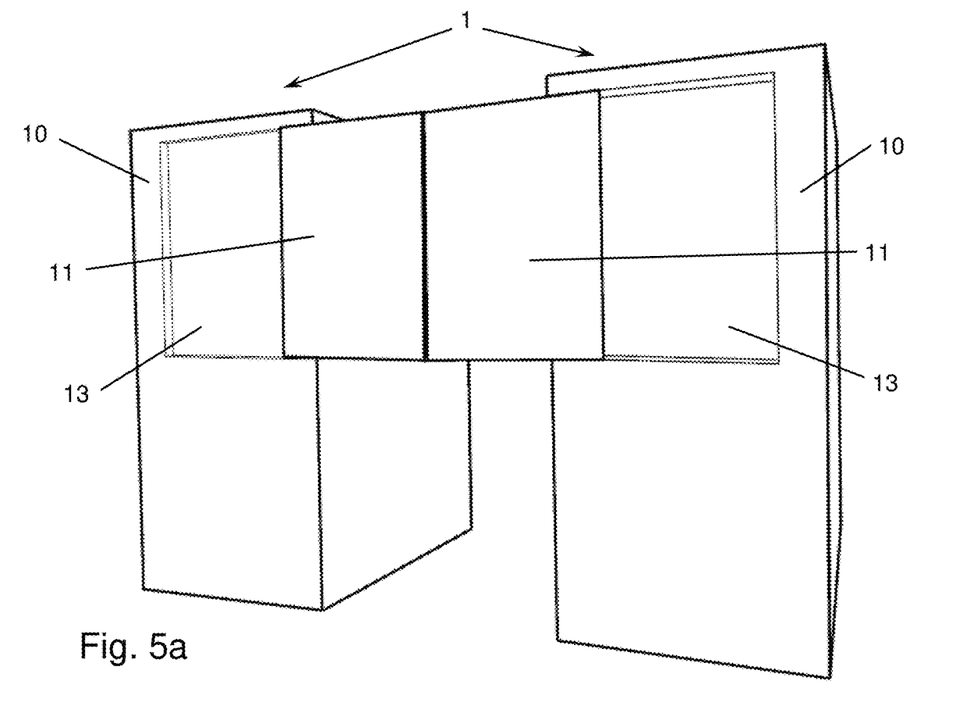
FIGS. 5a and 5b are three-dimensional schematic views of an on-board device according to an additional embodiment.
Figure 5B:
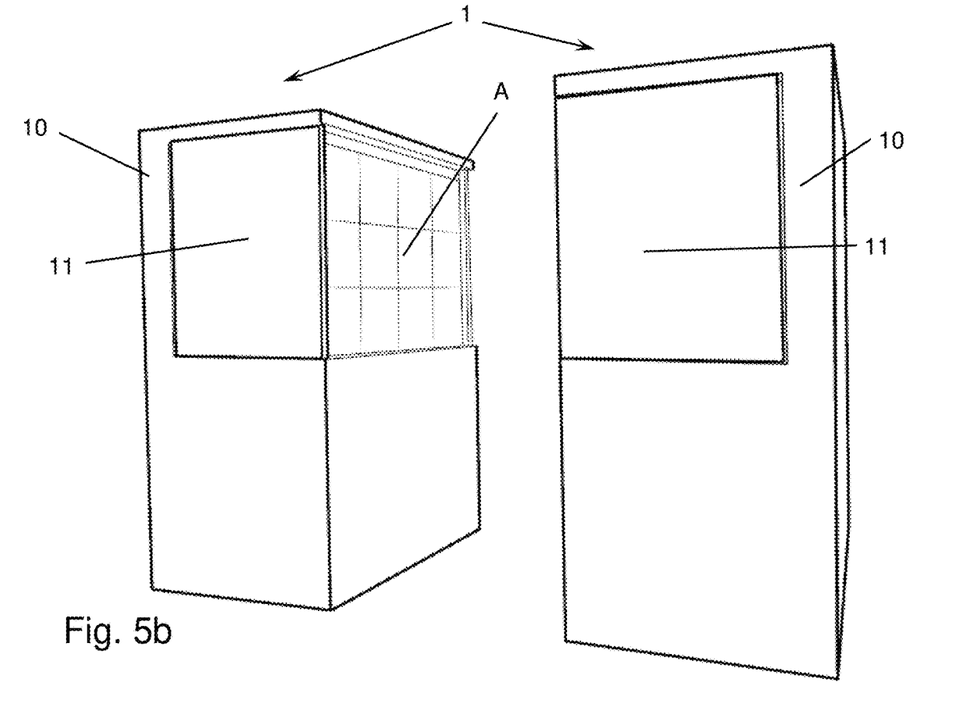

FIGS. 5a and 5b are three-dimensional schematic views of an on-board device 1 according to an additional embodiment. Here, the panelings 11 can be configured to be displaceable in a manner parallel to the corresponding side walls 10, in addition to or as an alternative to the ability to pivot. The paneling of the work area A is indirect, as shown in FIG. 5a. By combining two on-board devices 1 whose work areas A are turned towards each other, a configuration according to FIG. 5a can be created with which the area between the two on-board devices 1 is at least partially separated, whereby a space of a higher level of privacy, for example for the crew, can be established.

Figure 6A:
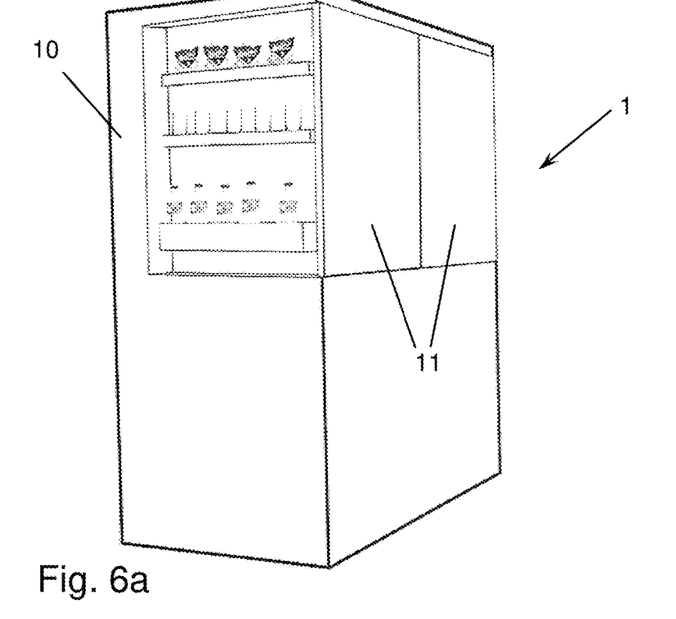
FIGS. 6a to 6c are three-dimensional schematic views showing exemplary functional designs of one configuration (of the boarding state) of the on-board device.
Figure 6B:
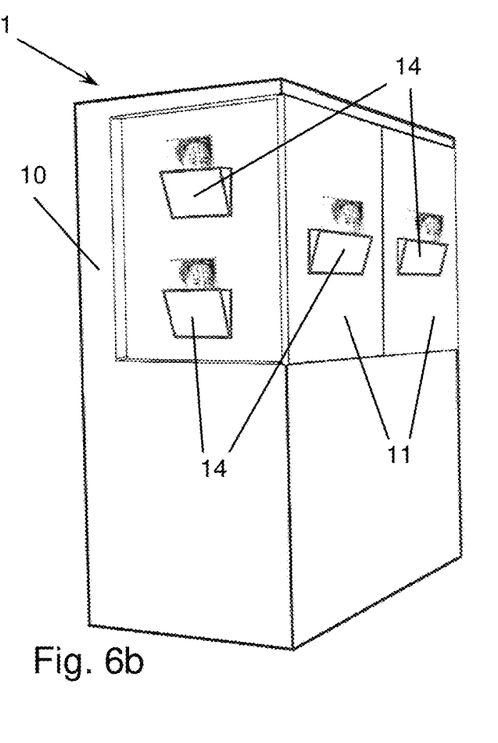
Figure 6C:
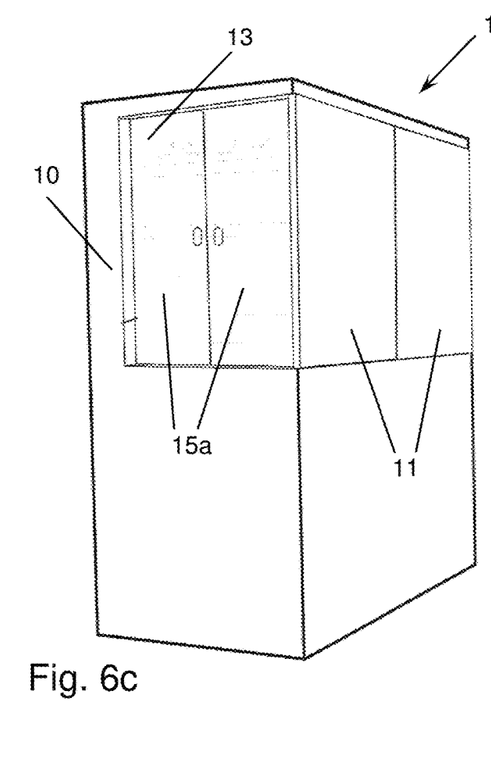

FIGS. 6a to 6c are three-dimensional schematic views showing additional functional configurations of the second configuration of the on-board device 1. The work area A is closed by the panelings 11, whereby a service can also be offered if the on-board device is not staffed by the crew.

For example, a bar area with shelves for drinks and glasses can be accessible in the recess 13 of the side wall 10, as shown in FIG. 6a. The bar area is concealed or closed in the service state by the corresponding paneling 11, whereby the functionality is in a sense reversed in comparison to the variant of FIG. 3a. FIG. 6b shows an exemplary embodiment with which pockets 14 are provided in the recess 13 of the side wall 10, for example for storing magazines. Alternatively or additionally, the outer sides of the panelings 11 can also be equipped with pockets 14. The pockets 14 are preferably flexible (for example, foldable or made of a fabric), which means that they hardly need any storage space when in the service state, concealed by the panelings 11.

Figure 7A:
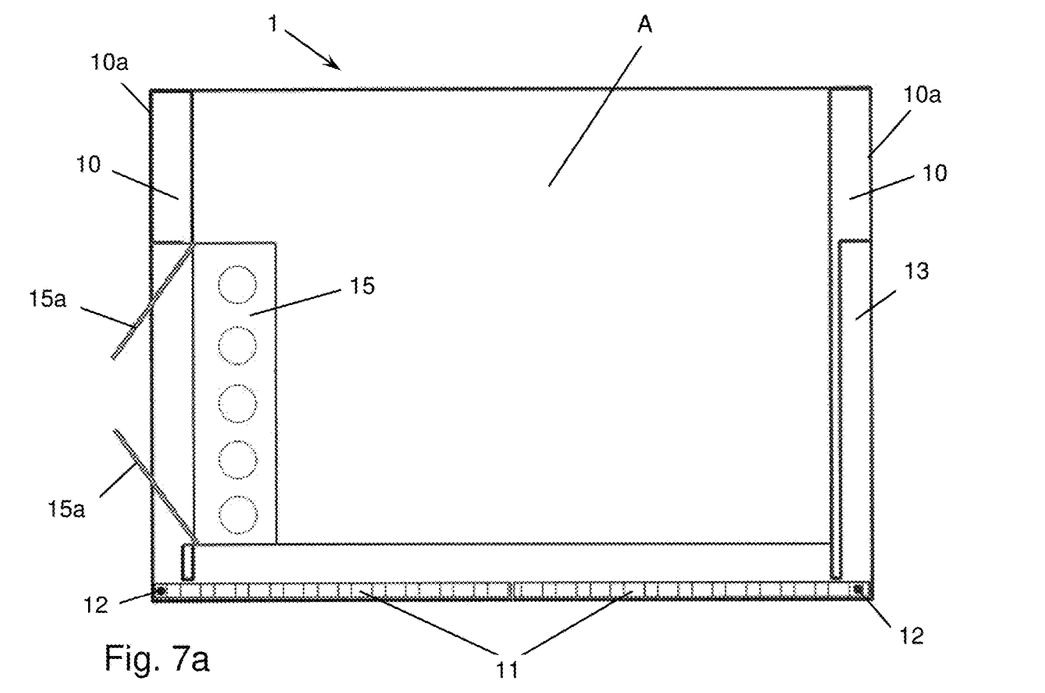
FIGS. 7a and 7b are schematic cross-sectional views of an on-board device with a compartment according to the embodiment of FIG. 6c.
Figure 7B:
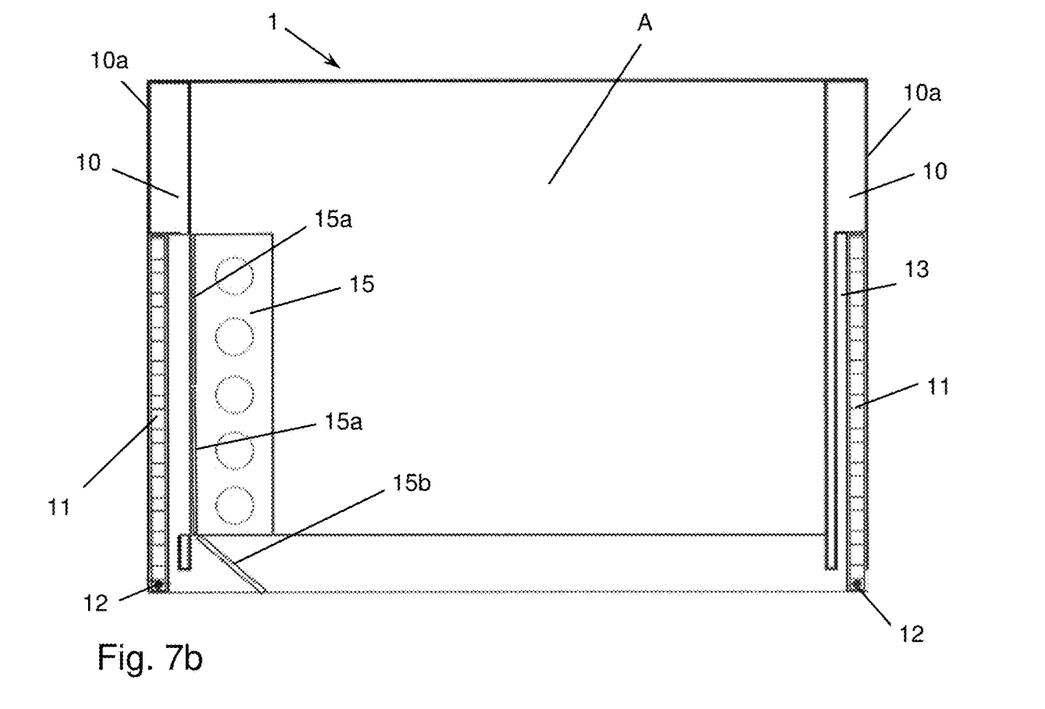

FIGS. 6c, 7a and 7b show one embodiment with which a compartment 15, preferably a refrigerated compartment, is provided in the recess 13 of a side wall 10. The compartment 15 can be closed and opened by one or more external doors 15a (FIG. 7a) and/or one or more internal doors 15b (FIG. 7b). The compartment 15 is accessible to passengers in the second configuration (boarding state), for example from the aisle via the external door(s) 15a, as shown in the sectional view of FIG. 7a. For filling and/or operating the compartment 15 by the crew, alternatively or additionally, it is accessible via the internal door(s) 15b, as shown in the sectional view of FIG. 7b. According to the preferred exemplary embodiment in FIG. 7b, access to compartment 15 via the internal door(s) 15b is only possible in the service state, i.e. with the cover 11 open.

To the extent applicable, all the characteristics depicted in the exemplary embodiments can be combined and/or exchanged without leaving the scope of the invention.

LIST OF REFERENCE SIGNS

1 On-board device
10 Side wall
10a Outer side of the side wall
11 Paneling
11i Inner side of the paneling
12 Axis of rotation
13 Recess
14 Pocket
15 Compartment/refrigerated compartment
15a External door
15b Internal door
110 Main part of the paneling
111 Extension
A Work area

The invention claimed is:

1. A galley or bar for a vehicle, comprising:
a side wall;
a compartment arranged in a recess of the side wall, the compartment having an external door; and
a paneling for partially or completely concealing a work area of the galley or bar,
wherein the paneling is adjustable between at least two configurations,
wherein the paneling, in a first configuration, forms or covers at least a part of the side wall and, in a second configuration, partially or completely conceals the work area,
wherein the compartment is accessible through the external door only when the paneling is in the second configuration,
wherein the side wall has a recess to accommodate the paneling in the first configuration, and
wherein a dimension of the recess corresponds to a dimension of the paneling.

2. The galley or bar as in claim 1,
wherein the vehicle is an airplane and
wherein the external door faces an aisle of the airplane.

3. The galley or bar as in claim 1,
wherein the paneling has an inner side that is visible from outside the bar or galley in the first configuration and
wherein the inner side is turned towards the work area in the second configuration, such that it is not visible from outside the bar or galley.

4. The galley or bar as in claim 1,
wherein the paneling is a rotatably mounted door, and
wherein the paneling covers the external door of the compartment in the first configuration.

5. The galley or bar as in claim 4, wherein the rotatably mounted door is pivotable by 270° around an axis of rotation.

6. The galley or bar as in claim 5, wherein the paneling comprises two panelings for partially concealing the work area.

7. The galley or bar as in claim 6, wherein the two panelings are symmetrical.

8. The galley or bar as in claim 6,
further comprising an additional side wall,
wherein the two panelings are adjustable between the at least two configurations, and
wherein the two panelings, in the first configuration, form part of the side wall and of the additional side wall and, in the second configuration, partially or completely conceal the work area.

9. The galley or bar as in claim 1,
wherein the paneling comprises multiple parts that can be pivoted and/or displaced relative to each other.

10. The galley or bar as in claim 9,
wherein the paneling comprises a main part and an extension, and
wherein the extension can be stowed in or on the main part in such a manner that the paneling in the first configuration fits into the recess.

11. The galley or bar as in claim 10,
wherein the extension can be inserted into a gap of the main part or is displaceable in a manner guided on a surface of the main part or is pivotable relative to the main part.

12. The galley or bar as in claim 1,
wherein the paneling is mounted in a displaceable manner parallel to the side wall.

13. The galley or bar as in claim 1, wherein the compartment is refrigerated.

14. The galley or bar as in claim 1
wherein a height of the paneling is essentially equal to a height of the galley or bar.

15. A galley or bar for a vehicle, comprising:
a side wall;
a compartment arranged in a recess of the side wall, the compartment having an external door; and
a paneling for partially or completely concealing a work area of the galley or bar,
wherein the paneling is adjustable between at least two configurations,
wherein the paneling, in a first configuration, forms or covers at least a part of the side wall and, in a second configuration, partially or completely conceals the work area, wherein the compartment is accessible through the external door only when the paneling is in the second configuration, and
wherein the compartment is accessible via an internal door from the work area when the paneling is in the first configuration.

16. The galley or bar as in claim 15,
wherein the internal door is configured such that it can only be opened in the first configuration, and
wherein the external door is configured such that it can only be opened in the second configuration.

17. An airplane, comprising:
a first galley, the first galley having
    a first side wall,
    a first paneling for partially or completely concealing a first work area of the first galley, the first paneling being adjustable between at least two configurations such that the first paneling, in a first configuration, forms or covers at least a part of the first side wall and, in a second configuration, partially or completely conceals the first work area, and
    a compartment arranged in a recess of the first side wall, the compartment having an external door, the compartment being accessible through the external door only when the first paneling is in the second configuration; and
a second galley, the second galley having
    a second side wall, and
    a second paneling for partially or completely concealing a second work area of the second galley, the second paneling being adjustable between at least two configurations such that the second paneling, in a first configuration, forms or covers at least a part of the second side wall and, in a second configuration, partially or completely conceals the second work area,
wherein the first galley and the second galley are arranged oppositely facing each other, and
wherein the first paneling is displaceable parallel to the first side wall and the second paneling is displaceable parallel to the second side wall, and
wherein the first paneling and the second paneling can be brought together to form a privacy shield for an area between the first galley and the second galley, and
wherein the first side wall has a recess to accommodate the first paneling in the first configuration, and
wherein a dimension of the recess corresponds to a dimension of the first paneling.

* * * * *